(12) United States Patent
Guo

(10) Patent No.: US 10,895,780 B2
(45) Date of Patent: Jan. 19, 2021

(54) LIQUID CRYSTAL DISPLAY PANEL AND METHOD FOR MANUFACTURING THE SAME

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventor: Yuanhui Guo, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/461,751

(22) PCT Filed: Mar. 28, 2018

(86) PCT No.: PCT/CN2018/080846
§ 371 (c)(1),
(2) Date: May 16, 2019

(87) PCT Pub. No.: WO2018/214640
PCT Pub. Date: Nov. 29, 2018

(65) Prior Publication Data
US 2019/0361295 A1 Nov. 28, 2019

(30) Foreign Application Priority Data

May 24, 2017 (CN) .......................... 2017 1 0374644

(51) Int. Cl.
*G02F 1/13357* (2006.01)
*G02F 1/1343* (2006.01)
*G02F 1/1368* (2006.01)

(52) U.S. Cl.
CPC ...... *G02F 1/133603* (2013.01); *G02F 1/1368* (2013.01); *G02F 1/13439* (2013.01); *G02F 1/133611* (2013.01)

(58) Field of Classification Search
CPC ..................... G02F 1/133345; G02F 1/133611
See application file for complete search history.

(56) References Cited

U.S. PATENT DOCUMENTS

| | | | |
|---|---|---|---|
| 2010/0244033 A1* | 9/2010 | Chen ................... | H01L 31/0384 257/59 |
| 2017/0069667 A1* | 3/2017 | Chen ................... | H01L 27/1443 |
| 2019/0011736 A1* | 1/2019 | Mizusaki .......... | G02F 1/133788 |

FOREIGN PATENT DOCUMENTS

| | | |
|---|---|---|
| CN | 101487953 A | 7/2009 |
| CN | 101614896 A | 12/2009 |

(Continued)

OTHER PUBLICATIONS

International Search Report and Written Opinion issued in corresponding International Application No. PCT/CN20181080846, dated Jun. 7, 2018, with English language translation.

(Continued)

*Primary Examiner* — Michael H Caley
*Assistant Examiner* — Mariam Qureshi
(74) *Attorney, Agent, or Firm* — McDermott Will and Emery LLP

(57) ABSTRACT

A liquid crystal display panel includes: a first substrate and a second substrate opposite to each other, and a liquid crystal layer provided between the first substrate and the second substrate. The liquid crystal display panel further includes electrodes provided on a surface of the first substrate facing the second substrate; and an optical sensing dielectric layer provided on the electrodes. The insulativity of the optical sensing dielectric layer decreases as light received from a (Continued)

backlight source corresponding to the liquid crystal display panel increases.

14 Claims, 2 Drawing Sheets

(56) References Cited

FOREIGN PATENT DOCUMENTS

| | | |
|---|---|---|
| CN | 105093620 A | 11/2015 |
| CN | 106405944 A | 2/2017 |
| CN | 107132707 A | 9/2017 |
| KR | 2002-0056728 A | 7/2002 |

OTHER PUBLICATIONS

First Office Action issued in corresponding Chinese Patent Application No. 201710374644.0, dated Oct. 12, 2018, with English language translation.
Second Office Action issued in corresponding Chinese Patent Application No. 201710374644.0, dated May 20, 2019, with English language translation.

* cited by examiner

LIQUID CRYSTAL DISPLAY PANEL AND METHOD FOR MANUFACTURING THE SAME

CROSS-REFERENCE TO RELATED APPLICATION

This application is a national phase entry under 35 USC 371 of International Patent Application No. PCT/CN2018/080846 filed on Mar. 28, 2018, which claims priority to Chinese Patent Application No. 201710374644.0, submitted to Chinese Patent Office on May 24, 2017, titled "LIQUID CRYSTAL DISPLAY PANEL AND METHOD FOR MANUFACTURING THE SAME", which are incorporated herein by reference in their entirety.

TECHNICAL FIELD

The present disclosure relates to the field of display technologies, and in particular, to a liquid crystal display panel and a method for manufacturing the same.

BACKGROUND

In recent years, thin film transistor liquid crystal displays (TFT-LCDs) have rapidly developed and occupied the mainstream position in the market due to their small size, low power consumption, no radiation, etc.

SUMMARY

One aspect of the present disclosure provides a liquid crystal display panel, and the liquid crystal display panel includes: a first substrate and a second substrate that are disposed opposite to each other, and a liquid crystal layer disposed between the first substrate and the second substrate. Electrodes are disposed on a surface of the first substrate facing toward the second substrate, an optical sensing dielectric layer is disposed on the electrodes. The optical sensing dielectric layer is configured such that an insulativity of the optical sensing dielectric layer decreases as light received from a backlight source corresponding to the liquid crystal display panel increases.

In some embodiments of the present disclosure, the optical sensing dielectric layer is optically transparent.

In some embodiments of the present disclosure, the electrodes are pixel electrodes and/or common electrodes.

In some embodiments of the present disclosure, a material of the optical sensing dielectric layer includes a polymer doped with metal particles.

In some embodiments of the present disclosure, the metal particles are silver particles or aluminum particles.

In some embodiments of the present disclosure, the diameters of the metal particles range from 200 nm to 2000 nm, or from approximately 200 nm to approximately 2000 nm.

In some embodiments of the present disclosure, the material of the optical sensing dielectric layer includes a polymer doped with a metal complex.

In some embodiments of the present disclosure, the metal complex includes a zinc complex, a copper complex or an aluminum complex.

Another aspect of the present disclosure further provides a method of manufacturing a liquid crystal display panel, which includes:

forming electrodes provided with an optical sensing dielectric layer on the first substrate;

dipping liquid crystal on a surface of the first substrate on which a functional film layer is located or a surface of the second substrate on which a functional film layer is located, and the optical sensing dielectric layer is configured such that an insulativity of the optical sensing dielectric layer decreases as the luminance of a backlight source corresponding to the liquid crystal display panel increases;

aligning the surface of the first substrate on which the functional film layer is located and the surface of the second substrate on which the functional film layer is located, and sealing the first substrate and the second substrate, so as to obtain the liquid crystal display panel.

In some embodiments of the present disclosure, the optical sensing dielectric layer is optically transparent.

In some embodiments of the present disclosure, sealing the first substrate and the second substrate refers to sealing a frame of a liquid crystal cell formed by aligning.

In some embodiments of the present disclosure, before forming electrodes provided with the optical sensing dielectric layer on the first substrate, the method of manufacturing the liquid crystal display panel further includes: providing the first substrate and the second substrate.

In some embodiments of the present disclosure, forming electrodes provided with the optical sensing dielectric layer on the first substrate, includes:

forming a light-transmissive conductive layer on the first substrate, and forming the electrodes via a patterning process; and forming a light-transmissive optical sensing thin film on the electrodes, and forming the optical sensing dielectric layer via a patterning process.

In some embodiments of the present disclosure, forming electrodes provided with the optical sensing dielectric layer on the first substrate, includes: forming a light-transmissive conductive layer on the first substrate, and forming a light-transmissive optical sensing thin film on the light-transmissive conductive layer, and then forming the electrodes and the optical sensing dielectric layer via an one-time patterning process.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art may obtain other drawings according to these drawings without paying any creative effort.

DETAILED DESCRIPTION

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Currently, the brightness of the TFT-LCD is generally adjusted according to the brightness levels of the LEDs. The inventors have found that the brightness of the LEDs decreases as the currents passing through the LEDs decrease. When the currents passing through the LEDs decrease to a certain level, the LED will be turned off. So, the LEDs are generally provided with the lowest brightness. However, since the lowest brightness of the LEDs is still relatively high, even if the brightness of the LEDs is adjusted to the lowest brightness that ensures the LEDs not to be turned off, the brightness of the TFT-LCD is still higher when viewing the TFT-LCD in a dim environment, which makes it easy to hurt the eyes of a user when the user views images displayed by the TFT-LCD.

Figure 1:
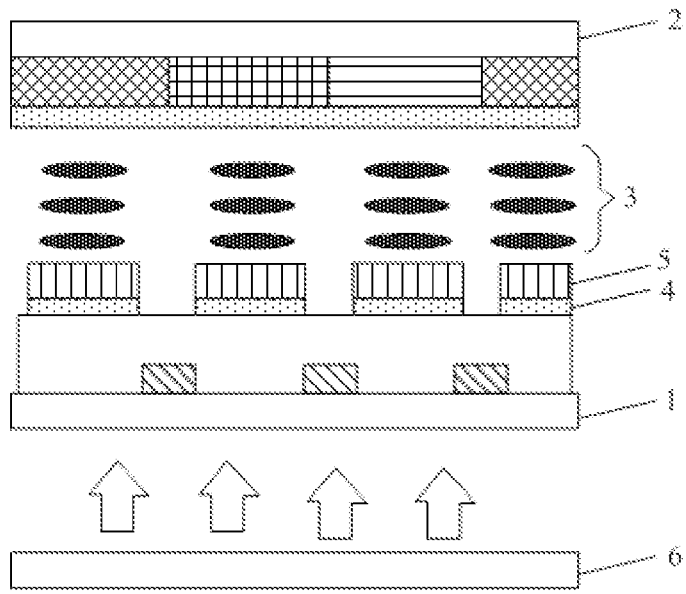
FIG. 1 is a schematic diagram showing a structure of a liquid crystal display panel according to some embodiments of the present disclosure.

As shown in FIG. 1, some embodiments of the present disclosure provide a liquid crystal display panel, and the liquid crystal display panel includes a first substrate 1 and a second substrate 2 that are disposed opposite to each other, and a liquid crystal layer 3 disposed between the first substrate 1 and the second substrate 2. Electrodes 4 are disposed on a surface of the first substrate 1 facing toward the second substrate 2. A light-transmissive optical sensing dielectric layer 5 is disposed on the electrodes 4, and the optical sensing dielectric layer 5 is configured such that its insulativity decreases as the luminance of a backlight source 6 corresponding to the liquid crystal display panel increases.

The above liquid crystal display panel may be, for example, a twisted nematic (TN) display panel, an in-plane switching (IPS) display panel, a fringe field switching (FFS) display panel or a vertical alignment (VA) display panel, etc. The other structures of the above liquid crystal display panel may be set with reference to the structures of the conventional liquid crystal display panel, which are not limited herein.

In the process of using the above liquid crystal display panel, when the liquid crystal display panel is used in a normal environment, the illumination intensity of the backlight source 6 is larger, and the insulativity of the optical sensing dielectric layer 5 is smaller. In this case, the conductivity of the optical sensing dielectric layer 5 is higher, and the strength of the electric field induced by the liquid crystal layer 3 is higher, so that the transmittance of the liquid crystal display panel is higher, thereby improving the brightness of the liquid crystal panel, which satisfies the requirement for the liquid crystal display panel with higher brightness by the user in the normal environment. When the liquid crystal display panel is used in a dim environment, the illumination intensity of the backlight source 6 is lower, which makes the insulativity of the optical sensing dielectric layer 5 larger. In this case, the conductivity of the optical sensing dielectric layer 5 is lower, and the strength of the electric field induced by the liquid crystal layer 3 is lower, so that the transmittance of the liquid crystal display panel is lower, thereby reducing a minimum brightness of the liquid crystal panel, which satisfies the requirement for the liquid crystal display panel with the lower brightness by the user in the dim environment.

For example, the above electrodes are pixel electrodes or common electrodes.

In some embodiments of the present disclosure, the material of the optical sensing dielectric layer is a polymer doped with metal particles. Since the material of the optical sensing dielectric layer is the polymer doped with metal particles, under the action of electric field, a hysteresis effect will appear in the dielectric conductance and dielectric polarization of the polymer, which will cause the energy loss in the polymer. The dielectric loss of polymer may be increased by doping metal particles in polymer. When the illumination intensity is higher, the conductivity of the polymer doped with metal particles is improved, and the dielectric loss is also improved. At this time, the state of the polymer doped with metal particles is close to the state of a conductor. When the illumination intensity is lower, the conductivity of the polymer doped with metal particles is decreased, and the dielectric loss is also reduced, and thus the state of the polymer doped with metal particles is close to the state of an insulator.

In some embodiments of the disclosure, a resistivity of the polymer ranges from $10^9$ Ω·m to $10^{22}$ Ω·m to ensure that the state of the polymer doped with metal particles is closer to the state of the insulator when the illumination intensity of the backlight source corresponding to the liquid crystal panel having the polymer doped with metal particles is lower. The polymer without doping metal particles may be, for example, a insulating polymer such as polystyrene or polyvinyl chloride, ect.

Since the metal activity of silver ion and aluminum ion is stronger, when the illumination intensity is higher, the dielectric loss of the polymer doped with silver particles or aluminum particles is faster, so that the state of the polymer doped with silver particles or aluminum particles is easier to reach the state of the conductor, i.e., the conductivity of the polymer doped with silver particles or aluminum particles is higher. Therefore, in some embodiments of the present disclosure, the doped metal particles are silver particles or aluminum particles.

In some embodiments of the present disclosure, the diameters of the doped metal particles range from 200 nm to 2000 nm, or from approximately 200 nm to approximately 2000 nm.

The specific size of the metal particles doped in the above polymer may be determined by considering the following two factors.

On the one hand, if the diameters of the metal particles that are doped are too large, the light transmission characteristic of the polymer doped with metal particles will be affected, and therefore, the diameters of the metal particles that are doped are less than 2000 nm or less than approximately 2000 nm. On the other hand, if the diameters of the metal particles that are doped are too small, the conductivity of the polymer doped with metal particles will be affected, and therefore, the diameters of the metal particles that are doped are greater than 200 nm or greater than approximately 200 nm.

In some embodiments of the present disclosure, the material of the optical sensing dielectric layer is a polymer doped with a metal complex. The dielectric loss of the polymer may be increased by doping the metal complex in the polymer. When the illumination intensity is higher, the conductivity of the polymer doped with the metal complex is improved, and the dielectric loss is also improved. In this case, the state of the polymer doped with the metal complex is close to the state of the conductor. When the illumination intensity is lower, the conductivity of the polymer doped with the metal complex is decreased, and the dielectric loss is also reduced. In this case, the state of the polymer doped with the metal complex is close to the state of the insulator.

In some embodiments of the present disclosure, the above metal complex is a zinc complex, a copper complex or an aluminum complex commonly used in a color filter for manufacturing the liquid crystal display panel, which may reduce the difficulty in selecting materials of the optical sensing dielectric layer. Thus, the manufacture cost of the liquid crystal display panel is reduced. For example, the metal complex may be a zinc complex or a copper complex with molecular structures as shown below:

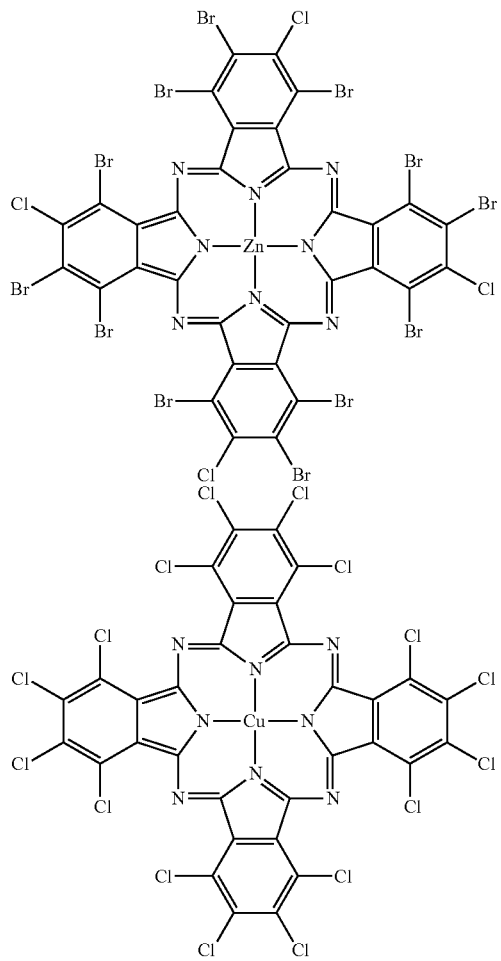

Figure 2:
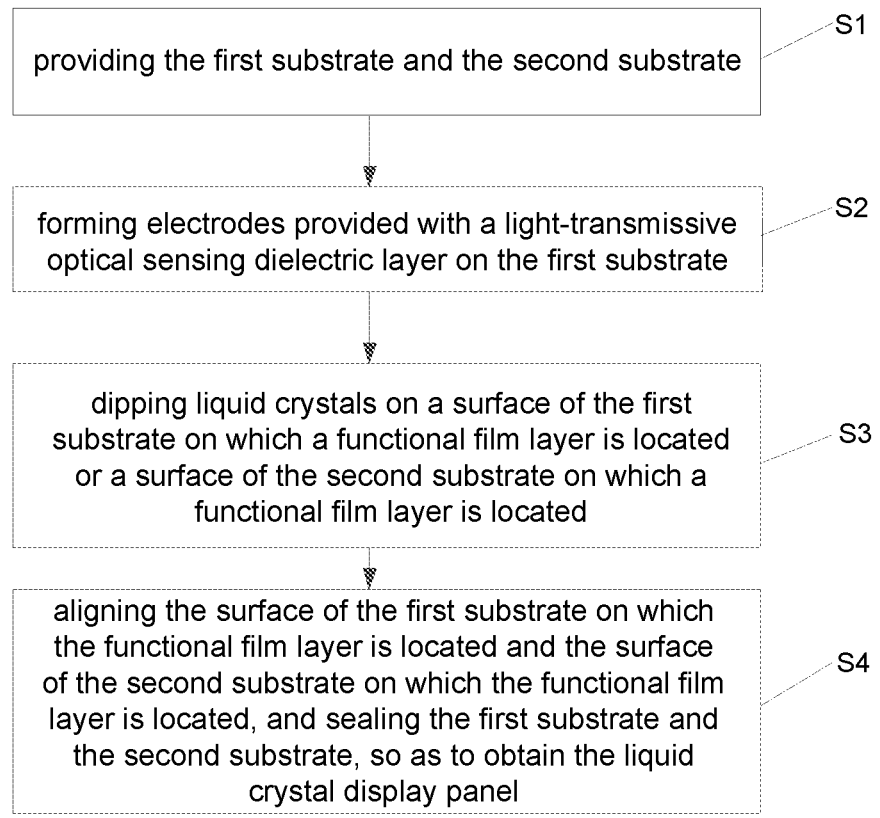
FIG. 2 is a flow chart of a method of manufacturing a liquid crystal display panel according to some embodiments of the present disclosure.

Some embodiments of the present disclosure further provide a method of manufacturing a liquid crystal display panel, which is used for manufacturing the liquid crystal display panel described above. As shown in FIG. 2, the method of manufacturing the liquid crystal display panel includes the following steps:

S1, providing a first substrate and a second substrate;

S2, forming electrodes provided with a light-transmissive optical sensing dielectric layer on the first substrate, wherein the optical sensing dielectric layer is configured such that its insulativity decreases as luminance of a backlight source corresponding to the liquid crystal display panel increases;

S3, dipping liquid crystals on a surface of the first substrate on which a functional film layer is located or a surface of the second substrate on which a functional film layer is located;

S4, aligning the surface of the first substrate on which the functional film layer is located and the surface of the second substrate on which the functional film layer is located, and sealing the first substrate and the second substrate, so as to obtain the liquid crystal display panel.

In the above S4, the sealing the first substrate and the second substrate refers to sealing the frame of a liquid crystal cell formed by aligning.

Beneficial effects of the method of manufacturing a liquid crystal display panel provided by some embodiments of the present disclosure may be with reference to beneficial effects of the liquid crystal display panel described above, which are not described herein.

Figure 3:
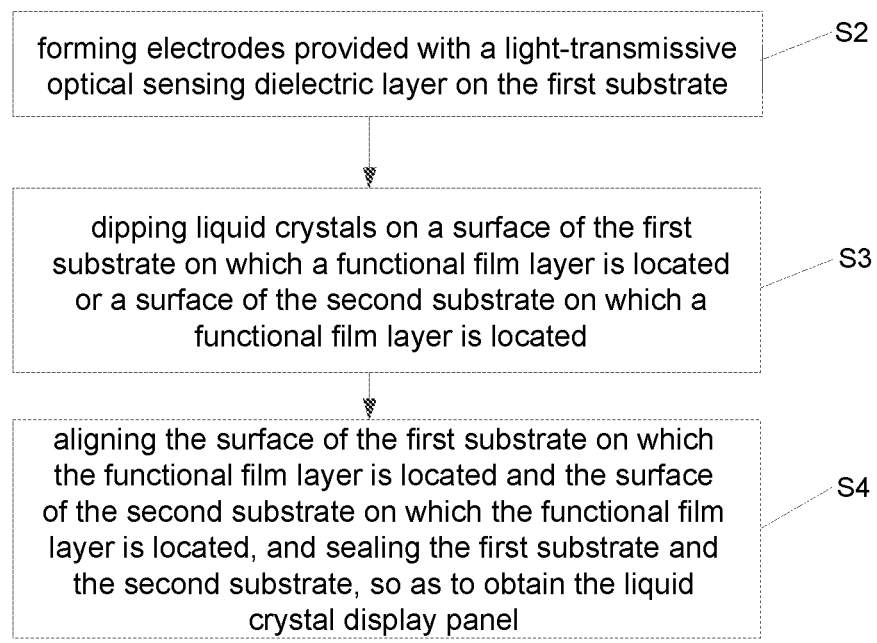
FIG. 3 is a flow chart of another method of manufacturing a liquid crystal display panel according to some embodiments of the present disclosure.

In some embodiments of the present disclosure, as shown in FIG. 3, the method of manufacturing the liquid crystal display panel includes the following three steps: S2, forming electrodes provided with an optical sensing dielectric layer on the first substrate, wherein the optical sensing dielectric layer is configured such that the insulativity of the optical sensing dielectric layer decreases as the luminance of the backlight source corresponding to the liquid crystal display panel increases; S3, dipping liquid crystals on a surface of the first substrate on which a functional film layer is located or a surface of the second substrate on which a functional film layer is located; and S4, aligning the surface of the first substrate on which the functional film layer is located and the surface of the second substrate on which the functional film layer is located, and sealing the first substrate and the second substrate, so as to obtain the liquid crystal display panel.

In some embodiments of the present disclosure, in the above S2, the method of forming electrodes provided with a light-transmissive optical sensing dielectric layer on the first substrate includes one of the following various methods.

Two examples of the various methods of forming electrodes provided with a light-transmissive optical sensing dielectric layer on the first substrate are provided below:

In a first method, a light-transmissive conductive layer is formed on the first substrate, and electrodes are formed via a patterning process; then, a light-transmissive optical sensing thin film is formed on the electrodes, and an optical sensing dielectric layer is formed via a patterning process.

The "patterning process" in the embodiments of the present disclosure refers to a conventional patterning process such as exposure, development, etc. Those skilled in the art may manufacture the components with reference to the existing patterning process.

For example, the light-transmissive conductive layer that may be formed on the first substrate by using a sputtering method or the like. Then a photoresist is coated on the light-transmissive conductive layer, and the photoresist is removed after the processes of exposure and development, so as to from electrodes. Next, a light-transmissive optical sensing thin film is formed on the electrodes via a spin coating or an inkjet printing. Since physical properties of the optical sensing thin film are similar to that of the photoresist that is commonly used by those skilled in the art, the optical sensing dielectric layer may be formed only after exposure and development processes.

In a second method, a light-transmissive conductive layer is formed on the first substrate, a light-transmissive optical sensing thin film is formed on the light-transmissive conductive layer, and electrodes and an optical sensing dielectric layer are formed via one-time patterning process.

For example, after a light-transmissive conductive layer is formed on the first substrate by using a method such as sputtering or the like, a light-transmissive optical sensing thin film is formed on the light-transmissive conductive layer by using a method such as spin coating or inkjet printing. Since physical properties of the optical sensing thin film are similar to that of the photoresist that is commonly used by those skilled in the art, the electrodes and the optical sensing dielectric layer may be formed only after exposure and development processes.

Comparing with the first method of forming electrodes provided with light-transmissive optical sensing dielectric layer, in the second method of forming electrodes provided with the light-transmissive optical sensing dielectric layer, after a light-transmissive conductive layer is formed on the first substrate and the light-transmissive optical sensing thin film is formed on the light-transmissive conductive layer, electrodes and the optical sensing dielectric layer may be formed via one-time patterning process, so that the process of manufacturing the liquid crystal display panel described above is simplified. In the first method of forming electrodes provided with the light-transmissive optical sensing dielectric layer, the patterning process is directly performed on the light-transmissive conductive layer, so that the precision of the pattern of the electrodes that is formed is higher. For the methods of forming electrodes provided with the light-transmissive optical sensing dielectric layer, a person skilled in the art may make a choice according to actual needs.

In the above description of the embodiments, specific features, structures, materials or characteristics may be combined in any suitable manner in any one or more embodiments or examples.

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A liquid crystal display panel, comprising: a first substrate and a second substrate that are disposed opposite to each other, and a liquid crystal layer disposed between the first substrate and the second substrate; the liquid crystal display panel further comprising:
   electrodes disposed on a surface of the first substrate facing toward the second substrate, wherein the electrodes are pixel electrodes and/or common electrodes; and
   an optical sensing dielectric layer disposed on the electrodes, wherein the optical sensing dielectric layer is configured such that an insulativity of the optical sensing dielectric layer decreases as light received from a backlight source corresponding to the liquid crystal display panel increases.

2. The liquid crystal display panel according to claim 1, wherein, the optical sensing dielectric layer is optically transparent.

3. The liquid crystal display panel according to claim 1, wherein, a material of the optical sensing dielectric layer includes a polymer doped with metal particles.

4. The liquid crystal display panel according to claim 3, wherein, the metal particles are silver particles or aluminum particles.

5. The liquid crystal display panel according to claim 3, wherein, the diameters of the metal particles range from 200 nm to 2000 nm.

6. The liquid crystal display panel according to claim 3, wherein, the diameters of the metal particles range from approximately 200 nm to approximately 2000 nm.

7. The liquid crystal display panel according to claim 1, wherein, a material of the optical sensing dielectric layer includes a polymer doped with a metal complex.

8. The liquid crystal display panel according to claim 7, wherein, the metal complex includes a zinc complex, a copper complex or an aluminum complex.

9. A method of manufacturing a liquid crystal display panel, comprising:
   forming electrodes provided with an optical sensing dielectric layer on the first substrate, wherein the electrodes are pixel electrodes and/or common electrodes, and the optical sensing dielectric layer is configured such that an insulativity of the optical sensing dielectric layer decreases as luminance of a backlight source corresponding to the liquid crystal display panel increases;
   dipping liquid crystals on a surface of the first substrate on which a functional film layer is located or a surface of the second substrate on which a functional film layer is located; and
   aligning the surface of the first substrate on which the functional film layer is located and the surface of the second substrate on which the functional film layer is located, and sealing the first substrate and the second substrate, so as to obtain the liquid crystal display panel.

10. The method of manufacturing the liquid crystal display panel according to claim 9, wherein, the optical sensing dielectric layer is optically transparent.

11. The method of manufacturing the liquid crystal display panel according to claim 9, wherein, sealing the first substrate and the second substrate refers to sealing a frame of a liquid crystal cell formed by aligning.

12. The method of manufacturing the liquid crystal display panel according to claim 9, wherein, before forming electrodes provided with the optical sensing dielectric layer on the first substrate, the method further comprises: providing the first substrate and the second substrate.

13. The method of manufacturing the liquid crystal display panel according to claim 9, wherein, forming electrodes provided with the optical sensing dielectric layer on the first substrate, includes:
   forming a light-transmissive conductive layer on the first substrate, and forming the electrodes via a patterning process; and
   forming a light-transmissive optical sensing thin film on the electrodes, and forming the optical sensing dielectric layer via a patterning process.

14. The method of manufacturing the liquid crystal display panel according to claim 9, wherein, forming electrodes provided with the optical sensing dielectric layer on the first substrate, includes:
   forming a light-transmissive conductive layer on the first substrate, and forming a light-transmissive optical sensing thin film on the light-transmissive conductive layer, and then forming the electrodes and the optical sensing dielectric layer via an one-time patterning process.

* * * * *